(12) United States Patent
Charreyre

(10) Patent No.: US 10,626,060 B2
(45) Date of Patent: Apr. 21, 2020

(54) METHOD AND PLANT FOR TREATING A MIXTURE OF WASTES WITH TWO COMPOSTING CYCLES

(71) Applicant: FINANCE DEVELOPPEMENT ENVIRONNEMENT CHARREYRE-FIDEC, Polignac (FR)

(72) Inventor: Fabien Michel Alain Charreyre, Allegre (FR)

(73) Assignee: FINANCE DEVELOPPEMENT ENVIRONNEMENT CHARREYRE—FIDEC, Polignac (FR)

( * ) Notice: Subject to any disclaimer, the term of this patent is extended or adjusted under 35 U.S.C. 154(b) by 0 days.

(21) Appl. No.: 15/313,731

(22) PCT Filed: May 22, 2015

(86) PCT No.: PCT/FR2015/051371
§ 371 (c)(1),
(2) Date: Nov. 23, 2016

(87) PCT Pub. No.: WO2015/177486
PCT Pub. Date: Nov. 26, 2015

(65) Prior Publication Data
US 2017/0137331 A1 May 18, 2017

(30) Foreign Application Priority Data
May 23, 2014 (FR) ...................................... 14 54696

(51) Int. Cl.
C05F 17/00 (2020.01)
C05F 17/02 (2006.01)
(Continued)

(52) U.S. Cl.
CPC ............ *C05F 17/0027* (2013.01); *B03B 9/06* (2013.01); *C05F 9/02* (2013.01); *C05F 17/0045* (2013.01);
(Continued)

(58) Field of Classification Search
None
See application file for complete search history.

(56) References Cited

U.S. PATENT DOCUMENTS

| 6,093,323 A | 7/2000 | Hofmann |
| 2010/0055767 A1* | 3/2010 | O'Kane ................. C05F 17/00 435/262.5 |

(Continued)

FOREIGN PATENT DOCUMENTS

| KR | 20120033437 A | 4/2012 |
| WO | 2007098610 A1 | 9/2007 |
| WO | 2010012877 A1 | 2/2010 |

OTHER PUBLICATIONS

International search report dated Aug. 6, 2015 for corresponding application No. PCT/FR2015/051371.

*Primary Examiner* — Wayne A Langel
(74) *Attorney, Agent, or Firm* — Nath, Goldberg & Meyer; Joshua B. Goldberg; Stephanie Majkut

(57) ABSTRACT

The invention concerns a method for treating a mixture of wastes (4) comprising biodegradable wastes, the method being characterized in that it includes the following successive steps:
Step A: the mixture of wastes (4) is subjected to a first composting cycle so as to obtain a mixture of pre-composted wastes (4),
Step B: the mixture of pre-composted wastes (4) is subjected to a drying so as to obtain a mixture of dried wastes (4), (Continued)

Step C: the mixture of dried wastes (4) is separated into at least a portion of heavy wastes (14) and a portion of light wastes (13), Step D: the portion of light wastes (13) is subjected to a second composting cycle to so as to obtain a mixture (4) of refined wastes (20).

Treatment of biodegradable wastes.

24 Claims, 4 Drawing Sheets

(51) Int. Cl.
    *B03B 9/06*       (2006.01)
    *C05F 9/02*       (2006.01)
    *B09B 3/00*       (2006.01)
    *B09B 5/00*       (2006.01)

(52) U.S. Cl.
    CPC ........ *C05F 17/027* (2013.01); *C05F 17/0276* (2013.01); *C05F 17/0288* (2013.01); *B09B 3/00* (2013.01); *B09B 5/00* (2013.01); *Y02A 40/215* (2018.01); *Y02P 20/145* (2015.11); *Y02W 30/43* (2015.05)

(56) References Cited

U.S. PATENT DOCUMENTS

| | | | |
|---|---|---|---|
| 2010/0055775 A1* | 3/2010 | O'Kane | C05F 17/00 435/290.3 |
| 2013/0067974 A1* | 3/2013 | Dufour | C05F 17/0045 71/14 |

* cited by examiner

METHOD AND PLANT FOR TREATING A MIXTURE OF WASTES WITH TWO COMPOSTING CYCLES

This is a National Phase Application filed under 35 U.S.C. 371 as a national stage of PCT/FR2015/051371, filed May 22, 2015, an application claiming the benefit of French Application No. 14 54696, filed May 23, 2014, the content of each of which is hereby incorporated by reference in its entirety.

TECHNICAL FIELD

The present invention concerns the field of treating wastes, in particular of treating biodegradable wastes in order to recycle them and valorize them, particularly in the form of compost.

The invention concerns more specifically a method for treating a mixture of wastes, the latter being with heterogeneous sizes, shapes and consistencies, the mixture of wastes comprising biodegradable wastes and non-biodegradable wastes.

The invention also concerns a plant for treating a mixture of wastes, the latter being with heterogeneous sizes, shapes and consistencies, the mixture of wastes comprising biodegradable wastes and non-biodegradable wastes.

PRIOR ART

Conventionally, the recovery of generally biodegradable, organic wastes can be performed by composting. Composting consists in an acceleration of the natural process of decomposition of the biological and/or organic material, and allows transforming worthless wastes into compost, which is stable, hygienic, rich in humic compounds. The compost can then be used for agriculture, in order to improve the structure of the soil, and contribute to its fertilization while increasing biodiversity.

On an industrial scale, it is thus possible to perform the composting of organic wastes contained in domestic wastes in order to allow their recovery, which advantageously allows preventing their burial or incineration, the last two solutions being particularly harmful to the environment, and likely to pollute the air and soil.

Nevertheless, the known industrial composting methods require a sorting of domestic wastes, which contain a very significant proportion of wastes which are undesirable and not suited for composting, such as for example of metals, plastic materials (including in particular chlorinated plastic materials such as PVC) and other inert materials, that it is necessary to separate from the mixture of domestic wastes.

It is known to ask households generating the domestic wastes to sort, or at least pre-sort, their domestic wastes by themselves. Henceforth, it is necessary to organize a selective collection of the wastes intended to be composted, and the other wastes intended for example to be recycled, to be incinerated or to be buried. However, despite the progressive awareness of the households about sorting and its beneficial consequences on the environment, most of the time, such a sorting or pre-sorting cannot be considered to be reliable. Indeed, the households or the communes may be unable to sort the wastes in a proper way, which requires in particular adapted infrastructures (several bins for collecting wastes, the organization of a selective collection), sometimes expensive, bulky, and generating an additional traffic. Furthermore, the households may be unable to perform sorting in a correct way, for example by ignoring the exact nature of the wastes or the possibilities of valorizing the latter, or still by lack of willingness to perform the sorting.

Most of the time, it is thus necessary to sort the wastes again before their industrial composting, in order to extract therefrom a portion effectively suitable for composting, which is particularly difficult and expensive because of the very nature of wastes, which is very heterogeneous, and mixed. It is in particular difficult to extract the organic material to be composted from the mixture of wastes contained therein, as the latter is generally sticky, dirty, disease carrier and smelly.

In fine, in practice, most of the wastes which may undergo a composting are actually incinerated or buried.

DISCLOSURE OF THE INVENTION

Consequently, the objects assigned to the present invention aim to remedy to the different drawbacks enumerated hereinbefore and to propose a new method and a new plant for treating a mixture of wastes allowing valorizing a very considerable portion of the mixture of wastes, in particular which have not been or a little subjected to a prior sorting.

Another object of the invention aims to propose a new method and a new plant for treating a mixture of wastes allowing valorizing selectively one or several portion(s) of the mixture of wastes despite the heterogeneity of said mixture of wastes.

Another object of the invention aims to propose a new method and a new plant for treating a mixture of wastes allowing producing refined wastes, of the compost kind, of good quality from the mixture of wastes.

Another object of the invention aims to propose a new method and a new plant for treating a mixture of wastes being low-pollutant and without negative impact on the environment.

Another object of the invention aims to propose a new method and a new plant for treating a mixture of wastes with a particularly low consumption of resources and energy.

Another object of the invention aims to propose a new method and a new plant for treating a mixture of wastes which are inexpensive and easy to implement.

Another object of the invention aims to propose a new method and a new plant for treating a mixture of wastes allowing reducing the number of infrastructures for collecting and treating wastes of communes.

Another object of the invention aims to propose a new method and a new plant for treating a mixture of wastes allowing simplifying the organization of collection of wastes by communes, businesses and households.

Another object of the invention aims to propose a new method and a new plant for treating a mixture of wastes allowing a treatment of the mixture of wastes in an almost, still fully, automated way.

The objects assigned to the invention are achieved by means of a method for treating a mixture of wastes, the latter being with heterogeneous sizes, shapes and consistencies, the mixture of wastes comprising biodegradable wastes and non-biodegradable wastes, the method being characterized in that it includes the following successive steps:

Step A: the mixture of wastes is subjected to a first composting cycle so as to compost, at least partially, the biodegradable wastes of said mixture of wastes, and to obtain a mixture of pre-composted wastes, Step B: the mixture of pre-composted wastes is subjected to a drying so as to obtain a mixture of dried wastes, Step C: the mixture of dried wastes is separated into at least one portion of heavy wastes and one portion of light wastes, the portion of heavy wastes being formed by wastes with a volumetric mass heavier than the wastes of the portion of light wastes, Step D: the portion of light wastes is subjected to a second composting cycle so as to compost, at least partially, the contained biodegradable wastes, and to obtain a mixture of refined wastes.

The objects assigned to the invention are also achieved by means of a plant for treating a mixture of wastes, the latter being with heterogeneous sizes, shapes and consistencies, the mixture of wastes comprising biodegradable wastes and non-biodegradable wastes, the plant being characterized in that it comprises:

- at least one first composting bay allowing subjecting the mixture of wastes to a first composting cycle so as to compost, at least partially, the biodegradable wastes of said mixture of wastes, and to obtain a mixture of pre-composted wastes,
- at least one bay for drying the mixture of pre-composted wastes, allowing obtaining a mixture of dried wastes,
- means for separating the mixture of dried wastes at least into a portion of heavy wastes and a portion of light wastes, the portion of heavy wastes being substantially formed by wastes with a volumetric mass heavier than the wastes of the portion of light wastes,
- at least one second composting bay allowing subjecting the portion of light wastes to a second composting cycle so as to compost, at least partially, the contained biodegradable wastes, and to obtain a mixture of refined wastes.

BRIEF DESCRIPTION OF THE DRAWINGS

Other particularities and advantages of the invention will appear and will come out in more detail upon reading the description made hereinafter, with reference to the appended drawings, given only as an illustrative and non-limiting example, in which.

BEST WAY TO REALIZE THE INVENTION

Figure 1:
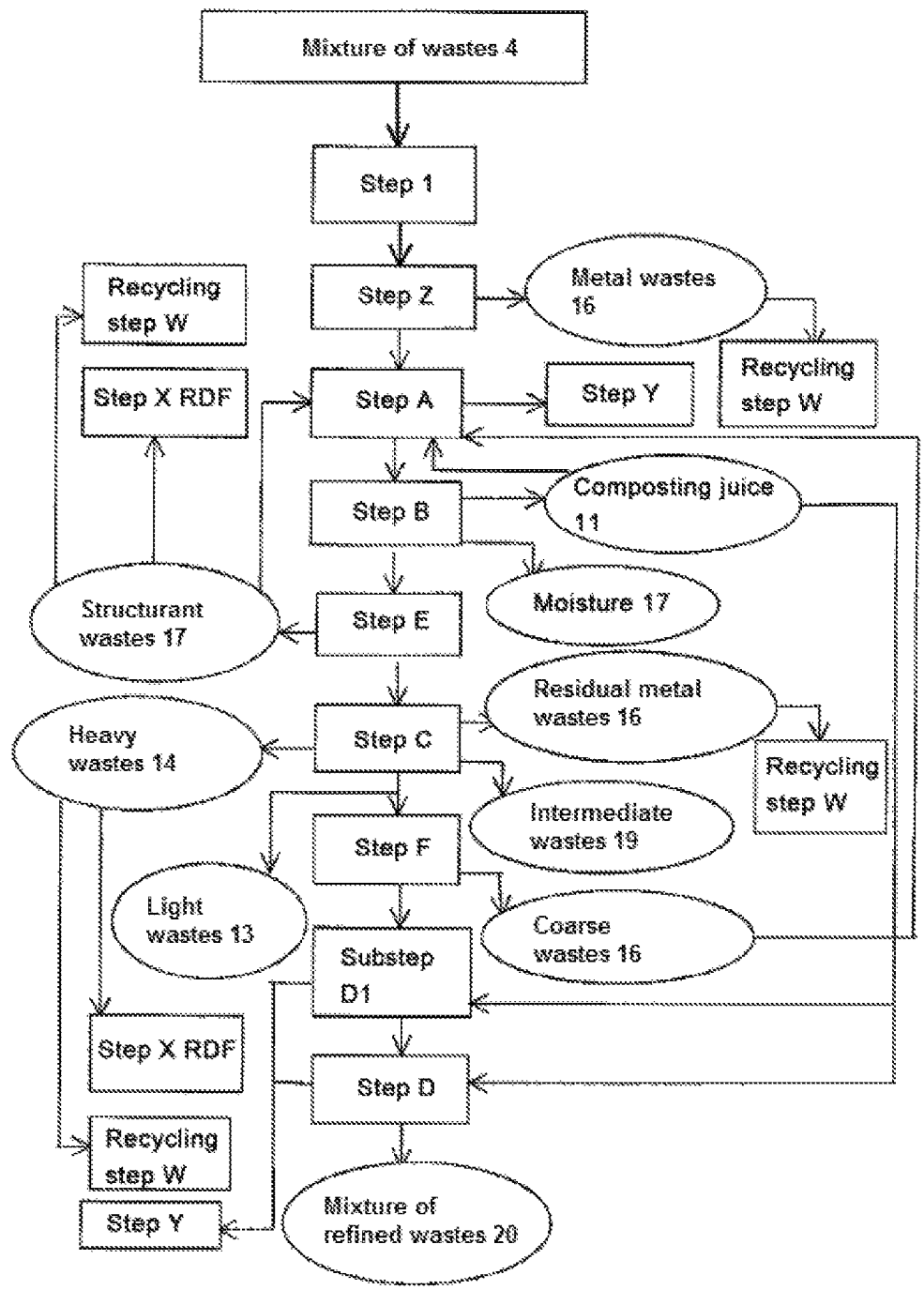
FIG. 1 is a flow chart representing the different steps of the method for treating a mixture of wastes according to the invention, as well as their temporal sequence, including in particular steps A, B, C and D of said treatment method.

The invention concerns a method for treating a mixture of wastes 4, aiming to refine, valorize and/or recycle all or part of the latter, and in particular for treating the biodegradable wastes contained therein.

Preferably, the mixture of wastes 4 is formed by domestic wastes, but it may be also formed by wastes of economic or industrial activities, or by both, said wastes not having undergone any prior sorting, or grinding.

Thus, this mixture of wastes 4 is advantageously formed by wastes generated by households, by their consumption and by their daily life.

Preferably, the mixture of wastes 4 has not undergone any treatment and forms a raw mixture of wastes 4. In particular, the raw mixture of wastes has not undergone any grinding, nor does it have undergone any prior sorting aiming to perform a segregation of one type of wastes from another, and in particular to perform a separation of the biodegradable wastes and of the non-biodegradable recyclable wastes. Preferably, the mixture of wastes 4 has been collected, for example by means of garbage trucks, from households and/or economic activities without said households and/or said economic activities having performed any sorting or prior selection of the collected wastes. In particular, the collection of the mixture of wastes 4 has not been selective. Thus, according to a particularly interesting variant of the invention, the method of the invention is a method for treating a raw mixture of non-ground wastes.

In this manner, the treatment method according to the invention is characterized in that the mixture of wastes 4 has not undergone any treatment and forms a raw mixture of wastes 4, which in particular has not undergone any grinding, nor does it have undergone any prior sorting aiming to perform a segregation of one type of wastes from another, and in particular to perform a separation of the biodegradable wastes and of the non-biodegradable recyclable wastes.

Of course, without departing from the scope of the invention, the mixture of wastes 4 may have been deprived, on the contrary, from a portion of the contained recyclable wastes, for example by the households during a preliminary sorting, or it may have undergone a preliminary sorting, for example by the households.

Advantageously, the wastes of the mixture of wastes 4 are collected in a raw and undifferentiated way, mixed in bags, such as plastic trash bags closed by the households, the method including a preliminary step of opening said bags in order to release the contained wastes individually so as to form the mixture of wastes 4 implemented in the method according to the invention, which is a grouping of the wastes initially contained in said wastes. For example, opening of the bags of wastes may be performed by means of a device for opening bags, so as to enable the release of the wastes out of said bags, preferably without damaging or altering said wastes.

In particular, because of the absence of any preliminary sorting before the entry of the mixture of wastes 4 in the treatment method of the invention, the wastes present heterogeneous sizes, shapes and consistencies, preferably with various natures and origins. In particular, the considered mixture of wastes 4 may in particular comprise, at the same time, soft, hard, sharp, liquid, powdery, solid, flat, hollow, full, sticky, slippery, fat, breakable, flexible, compressible, incompressible, combustible, incombustible wastes, or still wastes cumulating several of these characteristics. The mixture of wastes 4 contains a major portion of used and undesirable elements, for example food wastes, newspapers, papers, cardboards, glass, plastic, metal, textiles, various combustibles and incombustibles, complex materials, households hazardous wastes, inert wastes, bulky wastes.

According to the invention, the mixture of wastes 4 comprises biodegradable wastes and non-biodegradable wastes, the biodegradable wastes advantageously forming a non-negligible portion of the mixture of wastes 4.

Advantageously, at least 10%, preferably at least 20%, of the mass of the mixture of wastes 4 is formed by biodegradable wastes, and at least 10%, preferably at least 20%, of the mass of the mixture is formed by non-biodegradable recyclable wastes.

Preferably, a non-negligible portion of the mass of the mixture of wastes 4 is formed by biodegradable wastes, for example at least 50% of the mass of the mixture of wastes, or still at least 60%, or still at least 80%. Preferably, a non-negligible portion of the mass of the mixture of wastes 4 is in turn formed by non-biodegradable recyclable wastes.

By «biodegradable waste», is meant, in the context of the invention, a waste which, under the action of a natural environment, comprising for example living organisms and/or air and/or water, can be decomposed, naturally and spontaneously, into various elements likely to cause damages to the natural environment (high demand for oxygen, emission of leachates) unless being stabilized for example by composting. In particular, the living organisms may be formed by micro-organisms such as bacteria, funguses or algae, which are likely to degrade the biodegradable wastes through biochemical reactions. Preferably, by «biodegradable wastes», are meant wastes which can be degraded in this manner within a human lifetime, in a decade, or more preferably in one year or in a few months, preferably in a few weeks. Preferably, by «biodegradable wastes», are meant wastes which are likely to be used in the production and the formation of a compost by composting the latter.

The «non-biodegradable» wastes, in the context of the invention, constitute the other wastes, which do not undergo, spontaneously and naturally, such a degradation, or which undergo such a degradation in a too slow way. In particular, the «non-biodegradable» wastes are not adapted to enter into the formation of a compost by composting the latter.

A «recyclable» waste, in the context of the invention, forms a waste which may be easily transformed, for example chemically or mechanically, so as to form a recycled matter similar to a raw material, which may be used for example in the manufacture of an object. Preferably, the term «recyclable waste» excludes the biodegradable wastes, even though in practice their transformation into a compost confers a recyclable character to them. In the context of the invention, the recyclable wastes may comprise for example:

non-metallic wastes, in particular polymers, glass, papers, cardboard, newspapers, gravels, wood, textiles, electronics, etc.

metallic wastes, formed by any type of metals.

In the context of the invention, the term «non-recyclable wastes» refers to any waste which does not fall in any of the categories described hereinabove of «recyclable wastes» and «biodegradable wastes». In particular, the non-recyclable wastes regroup in particular wastes presenting a calorific value which makes them likely to be transformed into refuse-derived fuels, and other unusable ultimate wastes (complex wastes, etc.) intended for example to be buried or incinerated.

Thus, the treatment method of the invention aims to valorize the mass of mixed wastes forming the mixture of wastes 4 and in particular to particularly convert the biodegradable wastes contained therein into a mixture 4 of refined wastes 20, in such a manner that, preferably, the mixture 4 of refined wastes 20 forms a compost. Preferably, the mixture 4 of refined wastes 20 forms a compost complying with the standard NF U 44-051. The standard NF U 44-051 of 2006, called «*Organic amendments—Denominations, specifications and marking*», is a French standard.

According to an important feature of the invention, the treatment method comprises the following successive steps:

Step A: the mixture of wastes 4 is subjected to a first composting cycle so as to compost, at least partially, the biodegradable wastes of said mixture of wastes 4, and to obtain a mixture of pre-composted wastes 4, Step B: the mixture of pre-composted wastes 4 is subjected to a drying so as to obtain a mixture of dried wastes 4, Step C: the mixture of dried wastes 4 is separated into at least one portion of heavy wastes 14 and one portion of light wastes 13, the portion of heavy wastes 14 being formed by wastes with a volumetric mass heavier than the wastes of the portion of light wastes 13, Step D: the portion of light wastes 13 is subjected to a second composting cycle so as to compost, at least partially, the contained biodegradable wastes, and to obtain a mixture 4 of refined wastes 20.

The treatment method of the invention includes the treatment of the mixture of wastes 4 by two successive composting cycles separated by a step of drying the mixture of wastes 4 upon completion of the first composting cycle in order to facilitate the separation and the easier refining of the mixture of wastes 4. Thus, even if the mixture of wastes 4 is particularly heterogeneous and presents numerous undesirable wastes which are not likely to be treated by composting, it is possible to refine the latter through the method of the invention so as to obtain refined wastes 20 the value of which is higher than the value of the initial mixture of wastes.

Advantageously, the method is an industrial one wherein the steps are performed in line and parallel to each other. For example, while a first mixture of wastes 4 is subjected to step A, another mixture of wastes 4 is simultaneously subjected to step B while it has already been previously subjected to step A.

By «composting», is meant, in the context of the invention, a biological process of conversion and valorization of the organic wastes, and in particular the biodegradable wastes contained in the mixture of wastes 4, by promoting and/or accelerating the natural biodegradation process. Preferably, the composting cycles of the method allow converting at least a portion of initial the mixture of wastes 4 into a stabilized product, hygienic, rich in humic compounds, preferably into a compost. By «composting», is meant a composting, for example traditional or industrial, involving in particular the action of micro-organisms in order to degrade and putrefy wastes of the mixture of wastes 4, these micro-organisms being naturally present in the mixture of wastes 4 and/or added to the mixture of wastes 4, and/or brought to multiply in the mixture of wastes 4. In particular, the composting of the invention involves an aeration of the mixture of wastes 4, and/or a regulation of the humidity of the mixture of wastes 4 (for example by adding water to the mixture of wastes 4 and/or by reintroducing in the mixture of wastes 4 composting juices 11 emitted by the latter), and/or an addition of micro-organisms to the mixture of wastes 4 and/or an addition of structurants 17 in order to stimulate the composting process, and/or a supply of light, for example solar light.

Preferably, step A corresponds to, or comprises, a phase of degradation of the wastes, in particular the biodegradable wastes, whereas step C corresponds to, or comprises, a phase of maturation of the wastes, in particular the biodegradable wastes, so as to obtain the mixture 4 of refined wastes 20, the latter advantageously forming the compost. The degradation phase is advantageously reflected by a proliferation of micro-organisms in the mixture of wastes 4, whereas the maturation phase is preferably reflected by the progressive decrease of the amount of micro-organisms having proliferated during the degradation phase, and by the preservation of micro-organisms beneficial to the soils. The degradation and maturation phases may overlap each other, and even coincide with each other.

According to the invention, during step A, the first composting cycle allows composting the biodegradable portion of the mixture of wastes 4, whereas the non-biodegradable wastes remain, of course, substantially unaltered, and serve in particular as structurants 17 to the composting process, the structurant wastes 17 being intended in particular to improve the air flow within the mixture of wastes 4 during composting, so as to improve the aerobic composting.

Advantageously, both the first composting cycle of step A and the second composting cycle of step D are performed in an aerobic manner. For this purpose, the mixture of wastes 4 to be composted is preferably aerated, in particular by making an air flow circulate throughout the mixture of wastes 4 to be composted, or by stirring the mixture of wastes 4.

Preferably, a light source 5 is brought to the mixture of wastes 4 in order to improve its composting, for example a natural light source 5, and/or an artificial light source 5.

Figure 5:
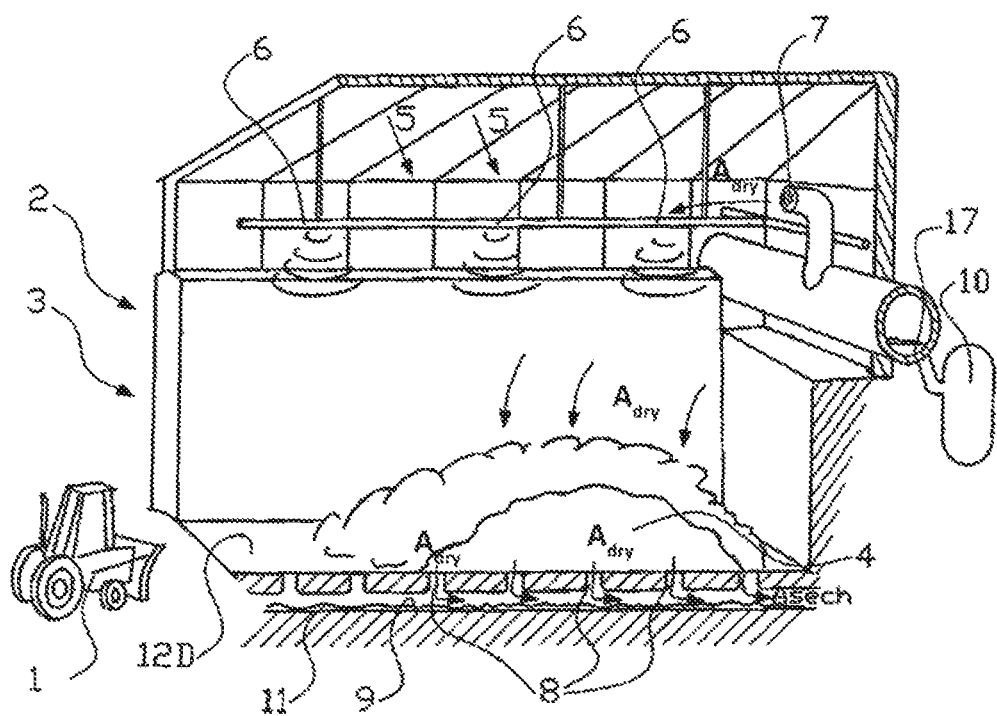
FIG. 5 illustrates, according to a perspective view, a longitudinal section of a drying/composting bay belonging to the treatment plant of FIGS. 3 and 4.

Advantageously, during step A and/or step D and/or step B, the considered mixture of wastes 4 being disposed in a heap which is turned over several times, for example by means of an adapted loader 1, in order to contribute to aerate the wastes (as illustrated for example in FIG. 5). Preferably, during step A, the mixture of wastes 4 is disposed in at least one first composting bay 3, for example in a heap. Still preferably, during step D, the wastes of the portion of light wastes 13 are disposed in at least one second composting bay 3.

Preferably, during step A, and/or during step D, the considered mixture of wastes 4 is humidified by means of humidity sources 6, the humidity sources 6 being formed for example by sprinkling devices or sprinkling ramps equipping the first and/or second composting bays, the heaps being intended to be sprinkled over by the sprinkling devices, said sprinkling devices being for example disposed above said heaps.

Thus, a regulation of the humidity of the composting mixture is advantageously operated during the composting cycles.

Advantageously, the method includes a step Y during which composting juices 11 oozing from the mixture of wastes is recovered in order to supply the humidity sources 6.

Preferably, step Y may also include capturing rainwater in order to supply the humidity sources 6, which allows in particular reducing the possible consumption of tap water, in particular drinking water, of the method.

Preferably, prior to step A, the method includes a step 1 during which a second fraction of wastes, the size of which is larger than 110 mm, is separated from the mixture of wastes 4. The wastes of larger size have been therefore advantageously separated from the mixture of wastes 4 by means of a sorting machine such as a rotary trammel. In particular, the wastes of the second fraction of wastes have a lower density with respect to wastes remaining in the mixture of wastes 4. Such segregation allows in particular increasing the concentration of biodegradable wastes in the mixture of wastes 4, by separating the most massive wastes from the initial mixture of wastes 4. By «size» of a waste, is meant a geometric dimension characteristic of an individual waste, which allows it, for example, to pass throughout a mesh with a corresponding size if the size of the waste is smaller than the size of the mesh, or, on the contrary, prevents it from passing if the size of said waste is larger than the size of said mesh.

Preferably, before step A, and in particular after step 1, the mixture of wastes 4 contains a major proportion of moist and/or sticky wastes, formed in particular by biodegradable wastes, or at the very least adapted to be composted. Advantageously, their sticky and/or moist character facilitates their separation from the residual second fraction of wastes by the sorting machine.

Preferably, prior to step A, the method includes a step Z during which metallic wastes 16 contained in the mixture of wastes 4 are separated, for example by means of an electromagnetic separator and/or an eddy current separator, so as to separate at least most of said metallic wastes 16 contained in the mixture of wastes 4. Thus, the mixture of wastes 4 intended to the first composting cycle is devoid of most of the metallic wastes 16 which it contained, and in particular those the size and/or the mass of which is considerable, so that the composting process of the first composting cycle is promoted and accelerated. Advantageously, the metallic wastes 16 separated at step Z may undergo the recycling step W.

According to the invention, step B, performed after step A for the considered mixture of wastes 4, allows retrieving all or part of the moisture 6 of the mixture of wastes 4 pre-composted during said step A. As illustrated in FIG. 5, to do so, the mixture of pre-composted wastes 4, disposed for example in a heap in at least one, or still in several, drying bay(s), is subjected to drying. Preferably, step B comprises a substep B1 of making a drying air flow $A_{sech}$ circulate throughout said mixture of pre-composted wastes 4 in order to dry the latter, the drying air flow $A_{sech}$ passing, to this end, throughout the heap of wastes. Advantageously, the drying air $A_{sech}$ is formed by a dry air current heated to a temperature comprised between 40° C. and 90° C., preferably 70° C., and which is capable of driving, during its passage in the mixture of pre-composted wastes 4, the moisture 6 contained in the latter. Preferably, the circulation of the drying air flow $A_{sech}$ is performed vertically, preferably from top to the bottom, or still from bottom to the top. Thus, a suction of drying air 8 is advantageously generated below the heap of pre-composted wastes.

Preferably, in order to implement step B, the mixture of pre-composted wastes 4 is disposed in heaps in drying bays, for example at the ground level. In order to contribute to drying of said mixture of pre-composted wastes 4, the method includes turning the heap over once or several times.

Preferably, and in order to save natural resources, at least a portion of the moisture 6 contained in the mixture of pre-composted wastes 4 is recovered during step B, and the humidity sources 6 are supplied with the recovered portion of moisture 6.

Preferably, the moisture 6 of the mixture of pre-composted wastes 4 is therefore retrieved from the latter during step B and then reintroduced afterwards in the portion of light wastes 13C at step D, so that this moisture is not wasted, and is reused, at least partially.

In particular, all or part of the composting juices 11 emanating from the mixture of pre-composted wastes 4 when drying is recovered, for example by draining the latter by means of a draining means 9 of the drying bay 2. Advantageously, these composting juices 11 are stored, and transported in order to be reintroduced later on when implementing the first and second composting cycles. In particular, since the composting juices 11 include water, micro-organisms and other elements useful to the proper progress of a composting operation, their reintroduction via the humidity sources 6 in a mixture of wastes 4 to be composted allows improving the composting of the latter while reducing the need for an external supply of water, micro-organisms and other elements useful to the proper progress of the composting operation.

Advantageously, the drying air $A_{sech}$ is brought to circulate at least by an air blowing 7 performed above the mixture of wastes 4, so that the drying air $A_{sech}$ drains the moisture 6 of the mixture of pre-composted wastes 4, the step of recovering the portion of moisture being performed, at least partially, by condensation of the moisture 6 coming from the mixture of pre-composted wastes 4 and drained by the flow of drying air $A_{sech}$.

Preferably, in this instance, each drying bay 2 also comprises means for circulating drying air $A_{sech}$ throughout the mixture of wastes 4 so as to dry the latter, the circulation means including at least:
  means for blowing air 7 above the mixture of pre-composted wastes 4,
  means for sucking drying air 8 below the mixture of pre-composted wastes 4.

In addition, each drying bay 2 advantageously comprises a recuperator 10 of a portion of the moisture 6 contained in the mixture of pre-composted wastes 4 when drying the latter, the moisture recuperator 10 allowing supplying the humidity sources 6 with the moisture 6 recovered when drying said pre-composted wastes.

Preferably, the flow of drying air $A_{sech}$ having circulated throughout the mixture of pre-composted wastes 4 is treated in order to clear it substantially from any composting emission, in particular any odorant emission, for example by filtering, or by a biochemical treatment. To this end, the drying bay(s) preferably comprise(s) means for treating the drying air $A_{sech}$ having circulated throughout the mixture of pre-composted wastes 4 in order to clear it substantially from any composting emission, in particular any odorant emission. In a general manner, the possible emissions of air and pollutants resulting from the implementation of the method are advantageously treated in this manner, which allows the method to be substantially non-polluting and to generate no odors.

Advantageously, upon completion of step B and prior to step C, said method includes a step E during which a portion of wastes the size of which is larger than about 30 mm, called the structurant wastes 17, whether they are biodegradable or not, composted or not, is separated from the mixture of dried wastes 4, and the concentration of structurant wastes 17 of other wastes undergoing step A is adjusted by adding the portion of structurant wastes 17 separated from the mixture of dried wastes 4, in particular in order to structure and scatter the first composting cycle. Advantageously, the separation of the structurant wastes 17 is performed by means of a rotary trommel the mesh of which allows segregating objects the size of which is larger than about 30 mm, and objects the size of which is smaller than about 30 mm. Thus, the structurant wastes 17 of the mixture of dried wastes 4 are advantageously reused in order to improve a current or subsequent first composting cycle of another mixture of wastes 4. In this manner, for the first composting cycle, it is not, or barely, necessary to add structurants 17 coming from a source external to the treatment method. Advantageously, a more or less large portion of the structurant wastes 17 recovered in the mixture of wastes 4 undergoing step A is reintroduced so as to adjust the concentration of structurants 17 of said mixture of wastes 4, by addition of a supplement, to a predetermined value, preferably allowing improving the first composting cycle. Preferably, the recovered structurant wastes 17 which have not been reintroduced may be sorted, for example manually or by means of a machine such as a rotary trommel, so as to separate recyclable wastes, to be recycled, and non-recyclable wastes, which undergo a refuse-derived fuel (RDF) production step X, or another type of re-treatment such as burial or incineration. Indeed, at this stage of the method, it is possible to consider making a portion of the mixture of dried wastes 4 enter in the refuse-derived fuel production step X, to the extent that the wastes have been dried and are dry enough, and in particular with an intrinsic humidity lower than about 10%.

According to the invention, all or part of the elements undesirable in the formation of the final mixture of refined wastes 20 are separated during step C. This separation is facilitated by the fact that, at this stage of the method, all or part of the biodegradable wastes have undergone the first composting cycle, so as to be composted, at least partially, and that these same biodegradable wastes are dry, and are therefore non-sticky, disseminated in the form of a powder or a gravel of a pre-compost which adheres, in a less significant manner, to the non-biodegradable wastes. Furthermore, these pre-composted and dry biodegradable wastes advantageously present, for most of them, a volumetric mass which is low and distinct from the rest of the wastes of the mixture of dried wastes 4. Thus, during step C, the portion of light wastes 13 comprises a major concentration of biodegradable wastes likely to be transformed into a compost. Thus, it is easy to perform a selection of the wastes likely to form the mixture 4 of refined wastes 20 among the mixture of wastes 4, which was relatively heterogeneous at the beginning.

Preferably, step C and step E are carried out by means of means for separating the mixture of dried wastes 4 at least into a portion of heavy wastes 14 and a portion of light wastes 13, the portion of heavy wastes 14 being substantially formed by wastes with a volumetric mass heavier than the wastes of the portion of light wastes 13. Advantageously, the separation means also include the trommel associated to step E. Optionally, the trommel associated to step E may be equipped with a brush allowing cleaning the portion of light wastes 13 by friction, in order to separate the aforementioned wastes.

Preferably, the portion of light wastes 13 separated during step C presents a volumetric mass lower than about 0.7 kg/L, preferably lower than about 0.6 kg/L, the dry compost generally presenting a volumetric mass close to 0.5 kg/L. The plastic materials presenting a volumetric mass most often higher than 0.8 kg/L may therefore be separated easily from the portion of light wastes 13. Thus, it is advantageously possible to separate, from the portion of light wastes 13, the plastic materials, including the chlorinated plastic materials such as polyvinyl chlorides (PVC), so that the mixture 4 of refined wastes 20 will be substantially free of these materials upon completion of step D, or will contain these materials in negligible proportions. For example, gravels and other stones, metals, glass, paper fibers, whether degraded or under degradation, may also be separated during step C, so that the mixture 4 of refined wastes 20 will be substantially free of these materials upon completion of step D, or will contain these materials in negligible proportions.

Figure 2:
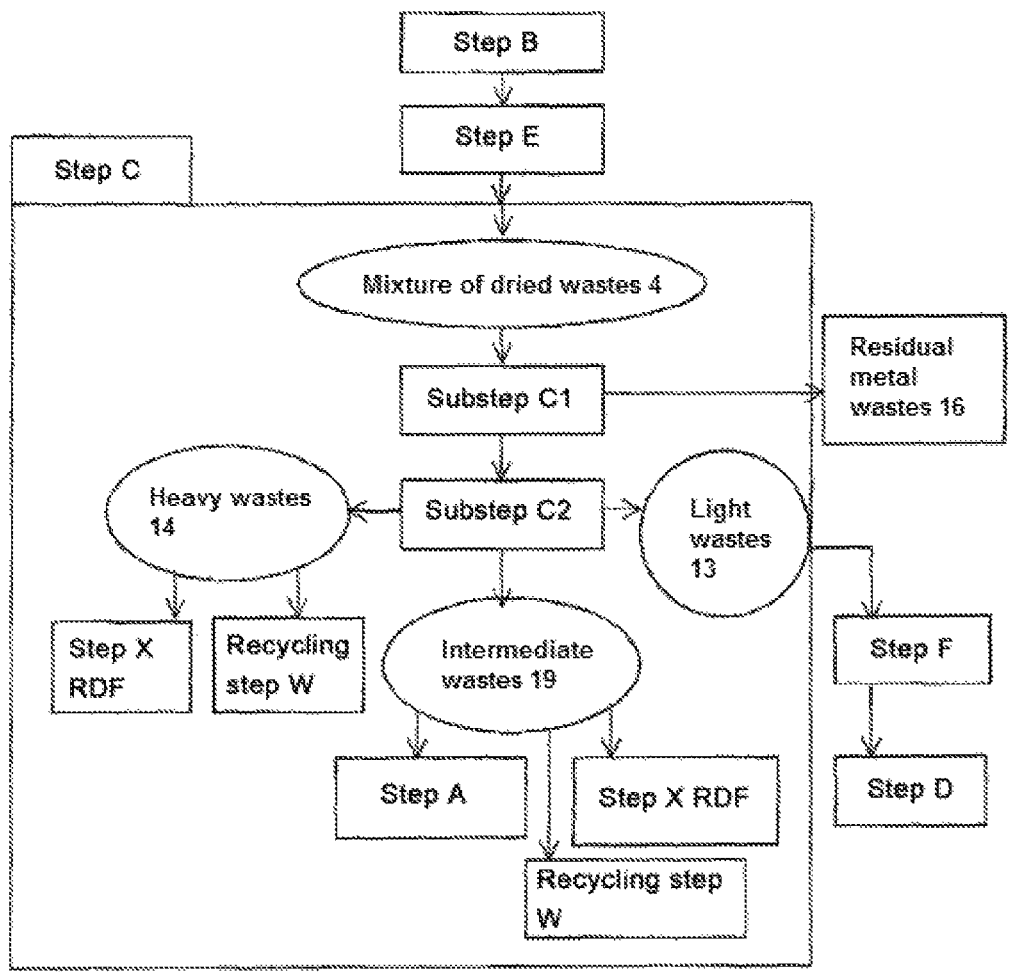
FIG. 2 is a flow chart representing in more detail the course of step C of FIG. 1.

As illustrated in FIG. 2, step C preferably comprises a first substep C1 during which residual metallic wastes 16 are separated from the mixture of dried wastes 4, for example by means of an electromagnetic separator and/or an eddy current separator, so as to separate at least most of the residual metallic wastes 16 contained in said mixture of dried wastes 4. Thus, are advantageously separated again all the ferrous (by means of the magnetic separator) and non-ferrous (by means of the eddy current separator) metallic elements contained in the mixture of dried wastes 4, which would have not been separated in particular during step Z. Advantageously, the «dried» state of the wastes facilitates such a separation. Preferably, this first substep C1 contributes to the formation of a high-quality mixture 4 of refined wastes 20, and in particular a compost complying with the standard NF U 44-051. Thus, the treatment method preferably comprises a step W of recycling the metallic wastes 16 initially contained in the mixture of wastes 4. Preferably, the substep C1 is performed before the separation of the heavy wastes and light wastes.

Preferably, besides the portion of heavy wastes 14 and light wastes 13, step C comprises a second substep C2, during which, the mixture of dried wastes 4 is separated, into a portion of intermediate wastes 19 the volumetric mass of which is intermediate, that is to say comprised between the volumetric mass of the wastes of the first and second portions of wastes, and said portion of intermediate wastes 19 is added to the mixture of wastes 4 undergoing step A. The intermediate wastes 19, the volumetric mass of which is for example higher than about 0.6 kg/L but lower than about 0.7 kg/L, are preferably sent back in a first composting cycle in accordance with step A. Indeed, it is possible that the intermediate wastes 19 could be formed by biodegradable wastes the degradation of which at the first composting cycle would be incomplete, or which would have not dried completely. Thus, this second substep C2 allows improving the separation between the wastes which will enter into the composition of the mixture 4 of refined wastes 20, and the other wastes.

Preferably, the second substep C2 is performed after the substep C1, and contributes to the separation of the heavy wastes and the light wastes.

Advantageously, step C, the first substep C1 and the second substep C2 are performed at least by means of the aforementioned separation means, comprising in particular a ballistic belt separator 12 (as illustrated for example in FIGS. 3 and 4) and an associated densimetric table separator. In this instance, the method preferably implements a first ballistic belt 12A allowing separating at first a portion of heavy wastes 14, the remainder of the mixture of dried wastes 4 being directed towards a second ballistic belt 12B allowing separating a portion of light wastes 13 and a portion of undetermined wastes 15. Advantageously, the portion of undetermined wastes is directed towards the densimetric separator, which allows separating the portion of undetermined wastes in a finer way, in particular by separating light wastes joining the portion of light wastes 13, heavy wastes joining the portion of heavy wastes 14, and the portion of undetermined wastes 19 described hereinbefore.

Figure 3:
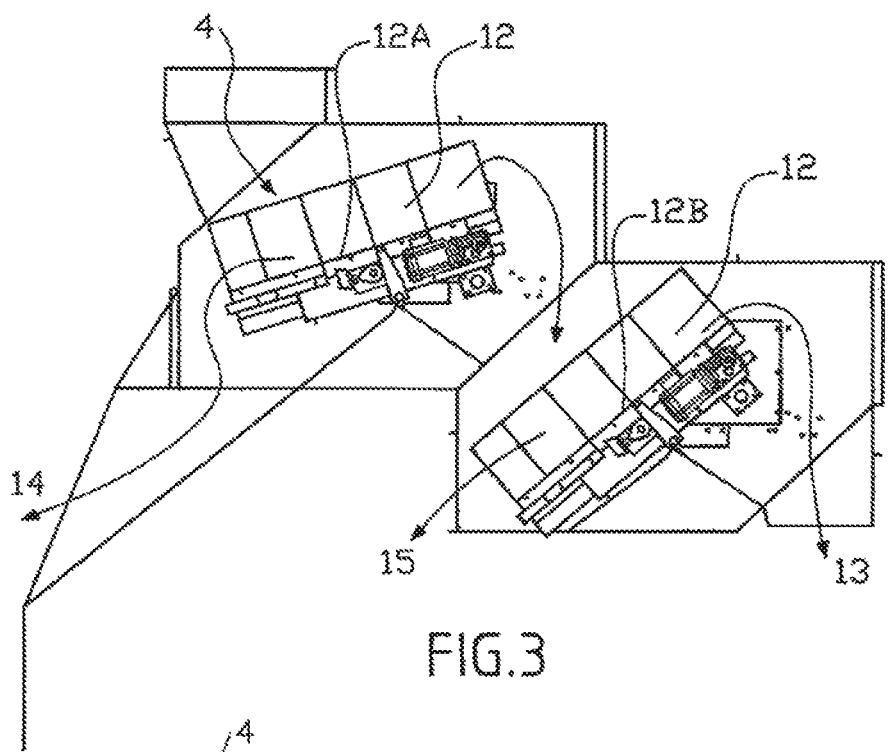
FIG. 3 illustrates, according to a side view, a longitudinal section of a separation means including a ballistic belt separator, belonging to the plant for treating a mixture of wastes according to the invention.
Figure 4:
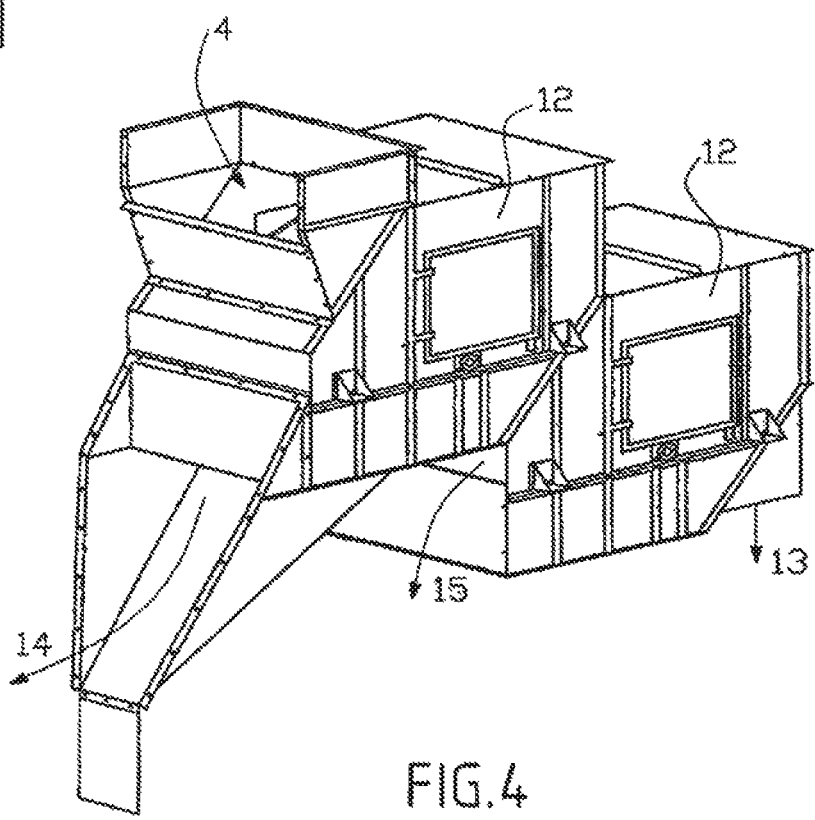
FIG. 4 represents, according to a perspective view, the separation means of FIG. 3.

As represented in FIGS. 3 and 4, the first and the second ballistic belts 12A, 12B are preferably included in the same machine, as illustrated in the figures, the first ballistic belt 12A directly supplying the second ballistic belt 12B by gravity. Advantageously, an accelerator belt may be placed upstream of the first ballistic belt 12A so as to accelerate the mixture of dried wastes 4 in order to project them on the first ballistic belt 12A with some kinetic energy so as to improve the separation of the wastes. Preferably, the first ballistic belt 12A and the second ballistic belt 12B present an inclination in the longitudinal direction, which inclination can be adjusted, for example between 20° and 70° with respect to the horizontal, in order to allow adjusting the separation of wastes. In order to improve the separation, the first and/or the second ballistic belt 12A, 12B preferably includes an elastic rolling strip allowing making some types of wastes rebound and roll on said rolling strip (in particular the heaviest ones), some other wastes being intended, on the contrary, to adhere to the rolling strip. Furthermore, the rolling strip may advantageously present adhesive or sticky properties, in particular in order to make the finest wastes adhere thereto. In particular, the mixture of dried wastes 4 comprises fines, which may advantageously be recovered in order to be introduced in the portion of light wastes 13, for example by scraping said ballistic belts 12 by means of a tungsten-made scraper equipping said ballistic belts (not represented).

Upon completion of step C, in particular upon completion of substep C2, and prior to step D, the method preferably includes a step F during which a portion of coarse wastes 18 the size of which exceeds 12 mm, is separated from the portion of light wastes 13, for example by means of a rotary trommel the mesh of which allows segregating objects the size of which is larger than about 12 mm, and objects the size of which is smaller than about 12 mm. In this case, the coarse wastes 18 form light wastes the size of which is too considerable to enter into the composition of the mixture 4 of refined wastes 20, and in particular to form the compost complying with the standard NF U 44-051. Advantageously, all or part of this portion of coarse wastes 18 is crushed in order to be reintroduced in the portion of light wastes 13 during step D. Alternatively, all or part of this portion of coarse wastes 18 is preferably reintroduced in a mixture of wastes 4 undergoing step A. Furthermore, all or part of this portion of coarse wastes 18, which may be formed by non-compostable wastes, may enter in the refuse-derived fuel production step X, or, if possible, undergo the recycling step W.

Finally, step D preferably allows refining the decomposition of the organic wastes contained in the initial mixture of wastes 4. At this stage of the method, the second composting cycle is performed on the portion of light wastes 13, which come from the mixture of wastes 4 which has been devoided from most of, still from all, the wastes undesirable in the formation of the final mixture 4 of refined wastes 20. Thus, a high-quality mixture 4 of refined wastes 20, likely to comply with particular standards, is obtained. Moreover, upon completion of the treatment method, the major portion of, still all, the biodegradable wastes of the mixture of wastes 4 enter into the composition of the final mixture 4 of refined wastes 20.

Preferably, step D is performed by placing the portion of light wastes 13, for example in heaps, in at least one second composting bay 3, for example similar to the first composting bay 3.

Advantageously, step D comprises at least one substep D1 of re-humidifying the light wastes, for example with the moisture 6 recovered during the drying step B, in order to promote the natural composting, and in particular the maturation of the compost during the second composting cycle so as to from the mixture 4 of refined wastes 20. Preferably, step D also comprises an aeration of the light wastes, for example in a similar way as step A (by means of an air flow, or several turnovers of the heap of light wastes) in order to promote the formation of refined wastes 20.

Preferably, step D may also comprise the reintroduction of micro-organisms in said light wastes, coming for example from the first composting cycle of step A.

Thus, it is possible to valorize the mixture of wastes 4 into a final mixture 4 of refined wastes 20, forming for example a compost in accordance with the standard NF U 44-051.

The invention also concerns, as such, a plant for treating a mixture of wastes 4, the latter being with heterogeneous sizes, shapes and consistencies, the mixture of wastes 4 comprising biodegradable wastes and non-biodegradable wastes, the plant comprising:

- at least one first composting bay 3 allowing subjecting the mixture of wastes 4 to a first composting cycle so as to compost, at least partially, the biodegradable wastes of said mixture of wastes 4, and to obtain a mixture of pre-composted wastes 4,
- at least one bay 2 for drying the mixture of pre-composted wastes 4, allowing obtaining a mixture of dried wastes 4,
- means for separating the mixture of dried wastes 4 at least into a portion of heavy wastes 14 and a portion of light wastes 13, the portion of heavy wastes 14 being substantially formed by wastes with a volumetric mass heavier than the wastes of the portion of light wastes 13,
- at least one second composting bay 3 allowing subjecting the portion of light wastes 13 to a second composting cycle so as to compost, at least partially, the contained biodegradable wastes, and to obtain a mixture 4 of refined wastes 20.

Preferably, the composting plant forms a facility implementing the method described hereinbefore. Henceforth, the elements of this composting plant, and in particular the first composting bay 3, the second composting bay 3, the drying bay 2, the separation means, advantageously correspond to those described hereinbefore.

Preferably, the first bay, and/or the second bay, comprise humidity sources 6 allowing humidifying the considered mixture of wastes 4, that is to say the mixture of wastes 4 and the portion of light wastes 13, respectively.

Advantageously, the drying bay 2 comprises a recuperator 10 of a portion of the moisture 6 contained in the mixture of pre-composted wastes 4 when drying the latter, the recuperator 10 allowing supplying the humidity sources 6 with the moisture 6 recovered when drying said pre-composted wastes.

Advantageously, the recuperator 10 corresponds to the recuperator described hereinbefore, and comprises for example a device for condensing the moisture 6 contained in the drying air, which has been extracted from the mixture of pre-composted wastes 4. For example, the recuperator 10 also comprises a device for draining the composting juices 11, disposed at the ground level 12, allowing capturing and draining said composting juices 11.

Preferably, the drying bay 2 comprises means for making a drying air $A_{sech}$ circulate throughout the mixture of pre-composted wastes 4 so as to dry the latter, the circulation means including at least:

- means for blowing air 7 above the mixture of pre-composted wastes 4,
- means for sucking drying air 8 below the mixture of pre-composted wastes 4, disposed for example at the ground level 120, under the heap of pre-composted wastes.

Advantageously, such an arrangement allows creating a flow of drying air $A_{sech}$ from top to the bottom so as to allow drying the mixture of pre-composted wastes 4.

Preferably, the condensation device is placed within the suction means 7 and/or the blowing means 8.

Preferably, the drying bay 2 comprises a light source 5 as described hereinbefore, allowing irradiating the mixture of wastes 4 as it dries, and therefore facilitating its drying.

Advantageously, the composting bay 3 also comprises a light source 5 allowing irradiating the mixture of wastes 4 as it is composted, and therefore improve the composting of the latter (as illustrated in FIG. 5), the natural light, and in particular the solar rays, being favorable to the development of life, and in particular to the micro-organisms which are sensitive thereto.

Advantageously, the light source 5 may be formed by a glazing placed at the base of the composting 3 or drying 2 bay, letting the Sun light pass through and protecting the bay from bad weather.

Advantageously, such an arrangement allows avoiding plugging of the circulation means.

Advantageously, the plant further comprises means for treating the drying air $A_{sech}$ having circulated throughout the mixture of pre-composted wastes 4 in order to clear it substantially from any composting emission, in particular any odorant emission, for example as described hereinbefore.

Preferably, the composting bays and the drying bays are identical, and/or coincident, so as to form composting/drying bays and ensure both associated functions selectively. Of course, the drying bays and the composting bays may be perfectly distinct from each other without departing from the scope of the invention.

As described hereinbefore, the separation means preferably include at least one ballistic belt separator 12 and an associated densimetric table separator allowing separating the portion of heavy wastes 14 and the portion of light wastes 13.

Thanks to such a plant, all or part of the method described hereinbefore may preferably be performed in an automated and industrial manner.

POSSIBILITY OF INDUSTRIAL APPLICATION

The invention finds its industrial application in the design, the realization and the implementation of means for treating a mixture of wastes with heterogeneous sizes, shapes and consistencies, which mixture comprises biodegradable wastes and non-biodegradable recyclable wastes.

The invention claimed is:

1. A method for treating a mixture of wastes (4), the latter being with heterogeneous sizes, shapes and consistencies, the mixture of wastes (4) comprising biodegradable wastes and non-biodegradable wastes, the method being characterized in that it includes the following successive steps:

Step A: the mixture of wastes (4) is subjected to a first composting cycle so as to compost, at least partially, the biodegradable wastes of said mixture of wastes (4), and to obtain a mixture of pre-composted wastes (4), Step B: upon completion of the first composting cycle, the mixture of pre-composted wastes (4) is subjected to a drying so as to obtain a mixture of dried wastes (4), Step C: the mixture of dried wastes (4) is separated into at least one portion of heavy wastes (14) and one portion of light wastes (13), the portion of heavy wastes (14) being formed by wastes with a volumetric mass heavier than the wastes of the portion of light wastes (13), the portion of light wastes (13) having a density less than about 0.7 kg/L, Step D: the portion of light wastes (13) is subjected to a second composting cycle so as to compost, at least partially, the contained biodegradable wastes, and to obtain a mixture (4) of refined wastes (20).

2. The treatment method according to claim 1, characterized in that, prior to step A, the method includes a step 1 during which a second fraction of wastes the size of which is larger than 110 mm is separated from the mixture of wastes (4).

3. The treatment method according to claim 1, characterized in that, prior to step A, it includes a step Z during which metal wastes (16) contained in the mixture of wastes (4) are separated, for example by means of an electromagnetic separator and/or an eddy current separator, so as to separate at least most of said metal wastes (16) contained in the mixture of wastes (4).

4. The treatment method according to claim 1, characterized in that, during step A, and/or during step D, the concerned mixture of wastes (4) is moistened by means of humidity sources (6).

5. The treatment method according to claim 1, characterized in that it includes a step Y during which composting juices (11) oozing from the mixture of wastes are retrieved for supplying the humidity sources (6).

6. The treatment method according claim 4, characterized in that a portion of the moisture (17) contained in the mixture of pre-composted wastes (4) during step B is retrieved, and in that the humidity sources (6) are supplied with the portion of the moisture (17) retrieved accordingly.

7. The treatment method according to claim 1, characterized in that step B comprises a substep B1 of circulating a drying air flow ($A_{dry}$) through said mixture of pre-composted wastes (4) in order to dry the latter.

8. The treatment method according to claim 7, characterized in that the circulation of the drying air flow ($A_{dry}$) is performed substantially vertically.

9. The treatment method according to claim 6, characterized in that the drying air ($A_{dry}$) is circulated at least by means of an air blowing (7) performed above the mixture of wastes (4), so that the drying air ($A_{dry}$) drains moisture (17) from the mixture of pre-composted wastes (4), the step of retrieving the portion of moisture being carried out at least partly by condensation of moisture (17) coming from the mixture of pre-composted wastes (4) and drained by the drying air flow ($A_{dry}$).

10. The treatment method according to claim 7, characterized in that the drying air flow ($A_{dry}$) having circulated through the mixture of pre-composted wastes (4) is treated to substantially discharge it from any composting, in particular odorous, emission.

11. The treatment method according to claim 1, characterized in that, during step A and/or step D and/or step B, the concerned mixture of wastes (4) is disposed in a heap which is turned over several times.

12. The treatment method according to claim 1, characterized in that, at the end of step B and prior to step C, said method includes a step E during which, is separated from the mixture of dried wastes (4), a portion of wastes the size of which is larger than about 30 mm, called structurant wastes (17), and the concentration of structurant wastes (17) of a second mixture of wastes (4) subjected to step A is adjusted by adding therein the portion of structurant wastes (17) thus separated from the mixture of dried wastes (4), so as in particular to structure and seed the first composting cycle.

13. The treatment method according to claim 1, characterized in that step C comprises a first substep C1 during which is separated from the mixture of dried wastes (4), residual metal wastes (16) contained therein, for example by means of an electromagnetic separator and/or an eddy current separator, so as to separate at least most of the residual metal wastes (16) contained in said mixture of dried wastes (4).

14. The treatment method according to claim 3, characterized in that it comprises a step (W) of recycling metal wastes (16) initially contained in the mixture of wastes (4).

15. The treatment method according to claim 1, characterized in that step C comprises a second substep C2 during which, besides the portion of heavy wastes (14) and light wastes (13), the mixture of dried wastes (4) is separated from a portion of intermediate wastes (19) the density of which is intermediate, that is to say comprised between the density of the wastes of the first and second portions of wastes, and during which said portion of intermediate wastes (19) is added in the mixture of wastes (4) subjected to step A.

16. The treatment method according to claim 1, characterized in that the portion of light wastes (13) separated during step C has a density less than about 0.6 kg/L.

17. The treatment method according to claim 1, characterized in that, upon completion of step C and prior to step D, said method includes a step F during which is separated from the portion of light wastes (13), a portion of coarse wastes (18) the size of which exceeds 12 mm.

18. The treatment method according to claim 1, characterized in that the mixture (4) of refined wastes (20) forms the compost.

19. The treatment method according to claim 18, characterized in that the mixture (4) of refined wastes (20) forms the compost meeting the standard NF U 44-051.

20. The treatment method according to claim 1, characterized in that the mixture of wastes (4) has not been subjected to any treatment and forms a raw mixture of wastes (4), on which in particular neither grinding has been carried out, nor prior sorting aiming to perform a separation of biodegradable wastes and non-biodegradable recyclable wastes.

21. A plant for treating a mixture of wastes (4), the latter being with heterogeneous sizes, shapes and consistencies, the mixture of wastes (4) comprising biodegradable wastes and non-biodegradable wastes, the plant being characterized in that it comprises:
  at least one first composting bay (3) allowing subjecting the mixture of wastes (4) to a first composting cycle so as to compost, at least partially, the biodegradable wastes of said mixture of wastes (4), and to obtain a mixture of pre-composted wastes (4),
  at least one bay (2) for drying the mixture of pre-composted wastes (4), said bay (2) for drying being designed for drying said mixture of precomposted wastes (4) upon completion of the first composting cycle, allowing obtaining a mixture of dried wastes (4),
  means for separating the mixture of dried wastes (4) at least into a portion of heavy wastes (14) and a portion of light wastes (13), the portion of heavy wastes 14 being substantially formed by wastes with a volumetric mass heavier than the wastes of the portion of light wastes (13), the portion of light wastes (13) having a density less than about 0.7 kg/L,
  at least one second composting bay (3) allowing subjecting the portion of light wastes (13) to a second composting cycle so as to compost, at least partially, the contained biodegradable wastes, and to obtain a mixture (4) of refined wastes (20),
  wherein the separation means include at least one ballistic belt separator (12) and one associated densimetric table separator allowing separating the portion of heavy wastes (14) and the portion of light wastes (13).

22. The treatment plant according to claim 21, characterized in that the first bay and/or the second bay comprise(s) humidity sources (6) allowing humidifying the concerned mixture of wastes (4), the drying bay (2) comprising a recuperator (10) of a portion of the moisture (17) contained in the mixture of pre-composted wastes (4) upon drying of the latter, the recuperator (10) allowing supplying the humidity sources (6) with moisture (17) retrieved upon drying said pre-composted wastes.

23. The treatment plant according to claim 21, characterized in that the drying bay (2) comprises means for circulating drying air ($A_{dry}$) through the mixture of pre-composted wastes (4) in order to dry the latter, the circulating means including at least:

air blowing means (7) above the mixture of pre-composted wastes (4), air suction means (8) drying below the mixture of pre-composted wastes (4).

24. The treatment plant according to claim 23, characterized in that it comprises means for treating the drying air ($A_{dry}$) having circulated through the mixture of pre-composted wastes (4) to substantially discharge it from any composting, in particular odorous, emission.

* * * * *